United States Patent [19]

Hertzler et al.

[11] Patent Number: 5,219,139
[45] Date of Patent: Jun. 15, 1993

[54] DEVICE FOR CONNECTING AN IV POLE TO A WHEELCHAIR

[75] Inventors: Lawrence W. Hertzler, Fenton; Elmer L. Reed, Festus, both of Mo.

[73] Assignee: Barnes Hospital, St. Louis, Mo.

[21] Appl. No.: 904,185

[22] Filed: Jun. 25, 1992

[51] Int. Cl.⁵ .............................................. E04G 3/00
[52] U.S. Cl. ................................. 248/276; 280/304.1
[58] Field of Search ............................ 248/125, 276; 297/DIG. 4, 188; 280/292, 304.1, 411, 250.1; 5/503, 508

[56] References Cited

U.S. PATENT DOCUMENTS

| | | | |
|---|---|---|---|
| 729,432 | 5/1903 | Sidway | 403/96 X |
| 3,583,734 | 6/1971 | Magi | 403/96 |
| 3,709,556 | 1/1973 | Allard et al. | 297/188 |
| 4,305,601 | 12/1981 | Berge | 280/289 |
| 4,511,157 | 4/1985 | Wilt, Jr. | 280/289 |
| 4,511,158 | 4/1985 | Varga et al. | 280/292 |
| 4,572,536 | 2/1986 | Doughty | 280/289 |
| 4,729,576 | 3/1988 | Roach | 280/493 |
| 4,767,131 | 8/1988 | Springer et al. | 280/289 |
| 4,840,391 | 6/1989 | Schneider | 280/304.1 |
| 4,945,592 | 8/1990 | Sims et al. | 5/508 |
| 5,009,442 | 4/1991 | Schneider | 280/304.1 |
| 5,083,807 | 1/1992 | Bobb et al. | 280/304.1 |
| 5,094,418 | 3/1992 | McBarnes | 248/125 X |
| 5,118,127 | 6/1992 | Partington | 280/304.1 X |
| 5,135,191 | 8/1992 | Schmuhl | 5/658 X |

FOREIGN PATENT DOCUMENTS 14880 of 1903 United Kingdom ................ 280/292

*Primary Examiner*—J. Franklin Foss
*Attorney, Agent, or Firm*—Armstrong, Teasdale, Schlafly & Davis

[57] ABSTRACT

A device for temporarily connecting an IV pole to a wheelchair to facilitate transportation of a patient receiving IV fluids. The device includes an articulated arm comprising first and second segments pivotally joined together, a mounting fixture for mounting the proximal end of the arm to the wheelchair, and a clamp on the distal end of the articulated arm for engaging the IV pole. The mounting fixture permits the arm to pivot about a horizontal axis in vertical plane extending generally rearwardly from the wheelchair, and permits the arm to rotate about its axis.

20 Claims, 2 Drawing Sheets

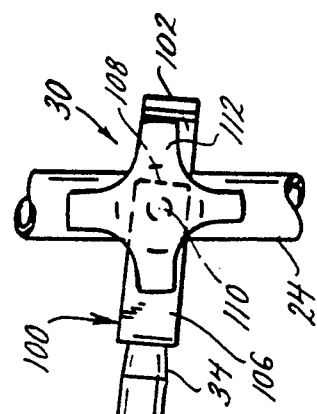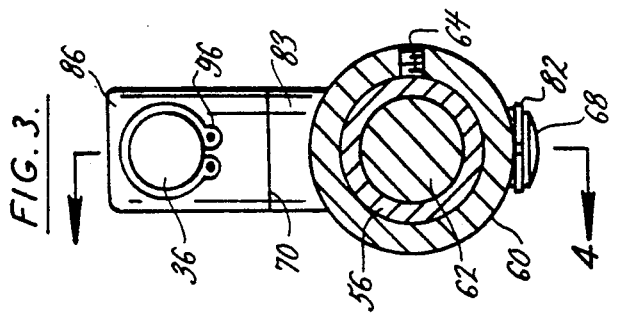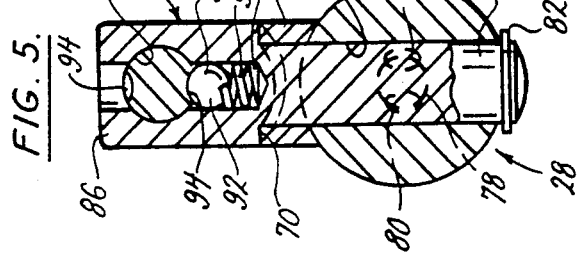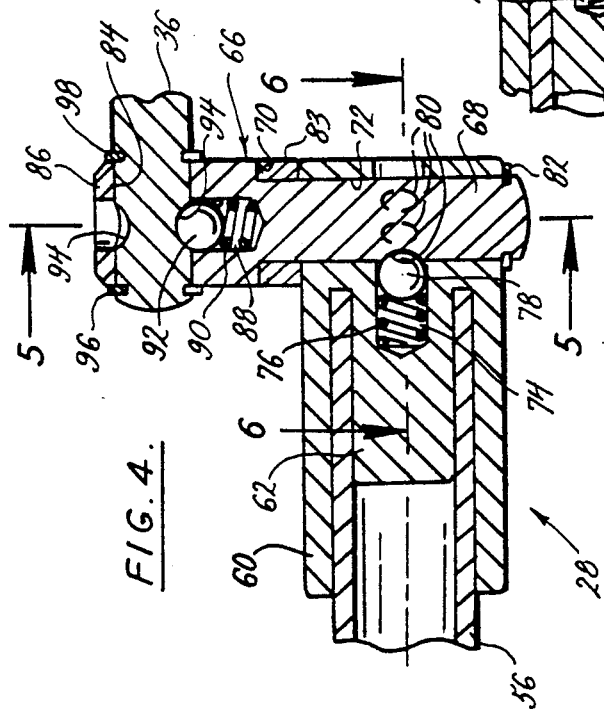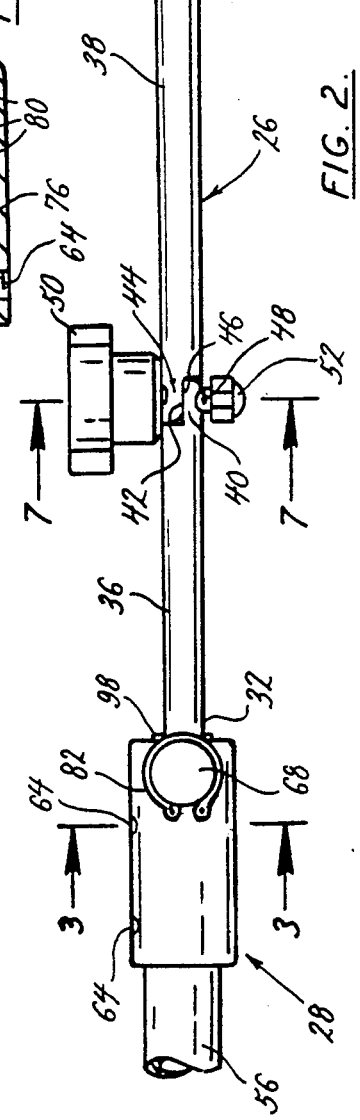

DEVICE FOR CONNECTING AN IV POLE TO A WHEELCHAIR

BACKGROUND AND SUMMARY OF THE INVENTION

This invention relates to a device for connecting an IV pole to a wheelchair to facilitate the transportation of a patient receiving IV fluids.

Because of the routine use of intravenous administration of fluids and medications in hospitals, it is common to provide an IV stand or pole to support the various IV fluid containers, associated tubing and related devices such as infusion pumps. These IV poles usually have wheels, so that they can be moved with the patient. However, when the patient is transported in a wheelchair, the patient has to hold onto the IV pole, if he or she is able, or the attendant must try to manipulate both the wheelchair and IV pole, or a second attendant must be provided to handle the IV equipment.

Several attempts have been made to alleviate the difficulties of transporting patients receiving IV fluids. One such attempt, illustrated in Allard et al., U.S. Pat. No. 3,709,556, is to provide a pole on the wheelchair. However, this requires repeated cumbersome transfers of the IV containers and infusion pumps on and off the pole as the patient gets in and out of the wheelchair. Further, the IV bags and infusion pumps mounted to the pole are in too close proximity to the patient's head and shoulders and collide with the patient during transportation and use. Moreover, the support poles on such designs are typically thin and provide problems in supporting and attaching one or more infusion pumps. Another attempt has been to provide some sort of connecting device for connecting an IV pole to the wheelchair. Schneider, U.S. Pat. Nos. 4,840,391and 5,009,442, Bobb et al., U.S. Pat. No. 5,083,807, Wilt, Jr., U.S. Pat. No. 4,511,157, and Springer, U.S. Pat. No. 4,767,131, disclose examples of such connecting devices. However, the connecting devices previously available have suffered from various problems and disadvantages. Some of these prior connecting devices could not be easily retrofitted on existing wheelchairs. Some of these connecting devices could not be used on folding wheelchairs, or were so heavy and/or cumbersome that they interfered with the folding and handling of the wheelchair. Some of these connecting devices did not provide any adjustability of the position of the IV pole.

The connecting device of the present invention is adapted for temporarily connecting an IV pole to a wheelchair or other medical patient transport device such as a stretcher to facilitate transportation of a patient receiving IV fluids. This device generally comprises an articulated arm comprising first and second segments pivotally joined together. A mounting fixture mounts the proximal end of the arm to the wheelchair, permitting the arm to pivot about a horizontal axis in vertical plane, and permitting the arm to rotate about its axis. There is a clamp on the distal end of the arm for releasably engaging the IV pole.

The device is thus of simple and inexpensive construction, and it is compact. The articulated arm and the pivotal mounting of the arm allows the IV pole to be conveniently positioned either behind the wheelchair when, for example, it is necessary to go through a narrow passageway, or at the side of the wheelchair to allow the operator more space when traveling through a wide hallway for example. The pivotal mounting of the arm also allows the arm to be folded compactly against the back of the wheelchair when the connecting device is not needed. Moreover, because the device folds compactly it does not interfere with the folding of the wheelchair. This same pivot further allows the front of the wheel chair to be raised to allow easy access to and passage over elevated or depressed thresholds such as ramps and elevators, for example. Detent mechanisms releasably hold the arm in its extended and folded positions, facilitating its use. The device can be positioned low on the wheelchair to engage the IV pole close to its base, to reduce the risk of tipping the IV pole.

These and other features and advantages will be in part apparent, and in part pointed out, hereinafter.

BRIEF DESCRIPTION OF THE DRAWINGS

FIG. 2 is a side elevation view of the connecting device in an elongated position;

FIG. 3 is a vertical cross-sectional view of the connecting device, taken along the plane of line 3—3 in FIG. 2;

FIG. 4 is a horizontal cross-sectional view of the connecting device, taken along the plane of line 4—4 in FIG. 3;

FIG. 5 is a vertical cross-sectional view of the connecting device, taken along the plane of line 5—5 in FIG. 2;

FIG. 6 is a partial vertical cross-sectional view of the connecting device, taken along the plane of line 6—6 in FIG. 5;

Corresponding reference numerals indicate corresponding parts throughout the several views of the drawings.

DETAILED DESCRIPTION OF THE PREFERRED EMBODIMENT

Figure 1:
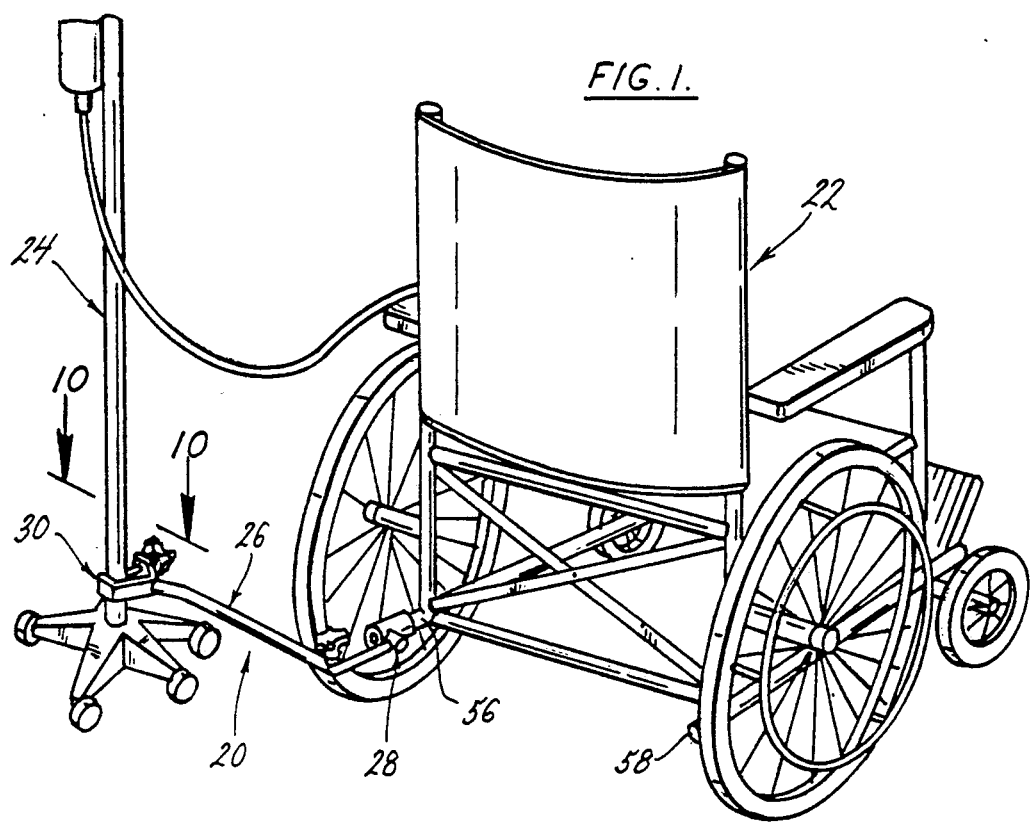
FIG. 1 is an isometric view of a connecting device constructed according to the principles of this invention, shown as it would be mounted on a wheelchair, and connected to an IV pole.
Figure 9:
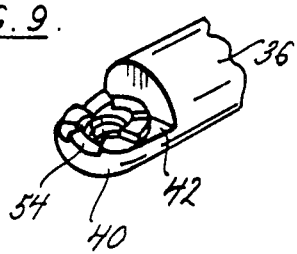
FIG. 9 is a partial perspective view of the end of one of the segments of the articulated arm.
Figure 7:
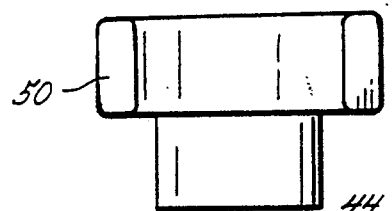
FIG. 7 is a vertical cross-sectional view of the connecting taken along the plane of line 7—7 in FIG. 2.
Figure 10:
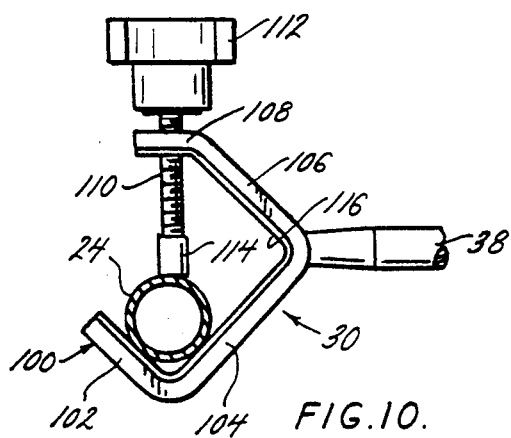
FIG. 10 is a horizontal cross-sectional view taken along the plane of line 10—10 in FIG. 1, showing the engagement between the clamp and the IV pole.
Figure 8:
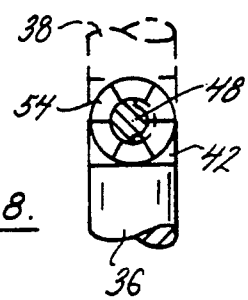
FIG. 8 is a horizontal cross-sectional view of the connecting device, taken along the plane of line 8—8 in FIG. 7.

A connecting device constructed according to the principles of this invention, indicated generally as 20, is shown in FIG. 1 as it would be mounted on a wheelchair 22 to temporarily connect the wheelchair to an IV pole 24 to facilitate the transportation of a patient receiving IV fluids. Generally, the connecting device 20 comprises an articulated arm 26, a mounting fixture 28 for mounting the arm on the wheelchair, and a clamp 30 on the end of the arm for releasably clamping the IV pole 24.

The articulated arm 26 has a proximal end 32 and a distal end 34, and comprises first and second segments 36 and 38, respectively, that are pivotally connected together. The proximal end of the first segment 36 is mounted in the mounting fixture 28. The clamp 30 is attached to the distal end of the second segment 38. The distal end 40 of the first segment 36 has an upwardly-facing flat surface 42, and the proximal end 44 of the second segment 38 has a corresponding downwardly-facing flat surface 46, that overlaps the surface 42. The two segments are connected by, and releasably secured with, a threaded fastener 48. There is a handle 50 on the upper end of the fastener 48, to facilitate turning the fastener. There is an acorn nut 52 on the lower end of the fastener 40, to retain the fastener 48. The fastener 48 extends through an opening in the proximal end of the second segment 38, and is threaded into the distal end of the first segment 36. This allows the turning of the handle 50 in one direction to draw the distal end of the first segment against the proximal end of the second segment and to sandwich the end of the second segment against the base of the handle, and allows turning the handle 50 in the other direction to separate the distal end of the first segment from the proximal end of the second segment from the handle. Mating ratchet-faced washers 54 on the surfaces 42 and 46 help to lock the segments relative to each other when the fastener 48 is tightened.

The mounting fixture 28 mounts the arm 26 to pivot about a horizontal axis, extending generally laterally with respect to the wheelchair, in a vertical plane extending generally rearwardly from the back of the wheelchair 22. The mounting fixture 28 also permits the arm 26 to rotate axially (about its own axis). As shown in FIG. 1, the frames of the vast majority of wheelchairs have hollow tubes 56 and 58, extending generally rearwardly from the lower part of the frame. The mounting fixture 28 preferably comprises a sleeve 60, for receiving one of the tubes 56 or 58. There is a boss 62 inside the sleeve 60, adapted to fit inside the hollow tube, so that the tube is securely engaged between the interior of the sleeve 60 and the exterior of the boss 62. Set screw holes 64 can be provided in the sleeve for set screws to engage the tube and secure the sleeve on the wheelchair.

A mounting member 66 extends generally perpendicularly from the sleeve 60, and is pivotally mounted to rotate about a first axis, generally perpendicular to the axis of the sleeve. This first axis preferably extends generally horizontally. As shown in FIG. 4, one end 68 of the mounting member 66 has a reduced cross-section, defined by shoulder 70. This end 68 is journaled in a bore 72 extending transversely through the base of sleeve 60. A detent mechanism releasably secures the mounting member 66 in particular preselected orientations with respect to the sleeve 60. A socket 74, extending generally perpendicularly from the bore 72, mounts a coil spring 76 and a ball 78. The spring 76 biases the ball 78 outwardly against the end 68 of the mounting member. The end 68 has a plurality of indentations 80 which the ball 78 engages to releasably hold the mounting member 66 in a particular preselected orientation with respect to sleeve 60. A locking ring 82, snap fit over the end 68, traps the sleeve 60 against a collar 83 on the mounting member, to prevent the mounting member from separating from the sleeve 60.

The proximal end of the arm 26 extends from the mounting member 66, generally perpendicular to the first axis. The proximal end of the arm 26 is journaled in a bore 84 in the second end 86 of the mounting member 66, for rotation about its own axis. A detent mechanism releasably secures the arm 26 in particular preselected angular orientations with respect to mounting member 66. A socket 88, extending generally perpendicularly from the bore 84, mounts a coil spring 90 and a ball 92. The spring 90 biases the ball 92 outwardly against the proximal end of the arm 26. The proximal end of the arm 26 has a plurality of indentations 94 which the ball 92 engages to releasably hold the arm 26 in a particular preselected orientation with respect to mounting member 66. Locking rings 96 and 98, snap fit one the distal end of the arm 26 to trap the end 86 of the mounting member 66 between them to prevent the arm from separating from the mounting member.

The clamp 30 on the distal end of the second segment 36 comprises a generally C-shaped frame 100, comprising segments 102, 104, 106, and 108. A threaded rod 110 is threaded through segment 108, and has a handle 112 for turning the rod, and an end cap 114, for engaging the IV pole, and trapping it against the junction between segments 102 and 104. The inside of the clamp 30 may be lined with a soft, flexible material 116 to prevent damage to the pole, reduce noise, and provide a snug secure connection.

OPERATION

In operation, the connecting device is mounted on a tube 56 or 58 on a conventional wheelchair 22. When properly mounted, the articulated arm 26 extends generally rearwardly from the wheelchair 22. The arm is mounted in such a way that it can pivot about a horizontal axis, in a vertical plane extending generally rearwardly from the wheelchair. The detent mechanism releasably holds the arm 26 in position so that it extends generally upwardly and rearwardly from the wheelchair 22.

The first segment 36 of the arm is sufficiently long to extend beyond the rearward edge of the wheels of the wheelchair 20. The second segment 38 of the arm 26 can be freely pivoted relative to the first segment so that the clamp 30 on its distal end can be manipulated to a wide range of positions from directly behind the wheelchair to a position at the side of the wheelchair. The handle 50 can be manipulated to tighten fastener 48, and secure the segments in their desired relative positions. There is a slight downward bend 118 in the second segment 38, which helps to level out the clamp 30, in view of the general upward slope of the arm 26 caused by the mounting fixture.

The clamp 30 is easily engaged to an IV pole by turning handle 112 to move the rod 110 sufficiently to allow the shaft of the pole between the concave junction between segments 102 and 104, and end cap 114. When the shaft is properly positioned, then the handle 112 can be turned the other way to move the rod 110 to engage the pole against the concave junction between segments 102 and 104.

When the connecting device is not needed, the arm 26 can be pivoted vertically upwardly against the back of the wheelchair, and rotated about its axis to lay flat against the back of the wheelchair. The detent mechanisms help to releasably hold the device in its folded configuration. The detent mechanisms are particularly useful for holding the device in its folded configuration. In the extended position the engagement with the IV pole holds the device in place.

The device is of simple, relatively compact construction. It is simple to operate, and can grip an IV pole in a wide range of positions from directly behind the wheelchair to at the side of the wheelchair, to accommodate narrow passageways, but yet allow the IV pole to be positioned to the side in larger passageways to permit the operator to have greater operating space. When not in use, the connecting device folds up compactly against the back of the wheelchair, and can itself fold so compactly that it does not interfere with folding up the wheelchair. The articulated connections permit great latitude in movement of the wheelchair and IV pole such as to accommodate changes in elevation during transport and to allow greater maneuverability. The device can also be connected to other medical patient transport devices such as stretchers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limited sense.

What is claimed is:

1. A device for temporarily connecting an IV pole to a wheelchair to facilitate transportation of a patient receiving IV fluids, the device comprising:
    an articulated arm comprising first and second segments pivotally joined together;
    a mounting fixture for mounting the proximal end of the arm to the wheelchair, which when mounted on the wheelchair permits the arm to pivot about a horizontal axis in a vertical plane extending generally rearwardly from the wheelchair, and permitting the arm to rotate about its axis; and
    a clamp on the distal end of the articulated arm for engaging the IV pole.

2. The device according to claim 1 adapted for a wheelchair of the type having a hollow tube extending horizontally rearwardly from the lower portion of the wheelchair, wherein the mounting fixture comprises a sleeve for receiving the tube, and a boss inside the sleeve adapted to fit in the hollow tube received in the sleeve.

3. The device according to claim 2 further comprising a mounting member pivotally mounted to the sleeve to pivot about a first axis perpendicular to the longitudinal axis of the sleeve, the mounting member pivotally mounting the proximal end of the arm for axial rotation about a second axis generally perpendicular to the first axis.

4. The device according to claim 3 wherein the first axis is generally horizontal, and extends generally laterally with respect to the wheelchair.

5. The device according to claim 3 wherein the mounting fixture further comprises a detent mechanism for releasably stopping the pivoting of the mounting member relative to the sleeve.

6. The device according to claim 3 wherein the mounting fixture further comprises a detent mechanism for releasably stopping the pivoting of the arm relative to the mounting member.

7. The device according to claim 1 wherein the second segment of the arm has a downward bend therein.

8. The device according to claim 1 further comprising a fastener for releasably locking the segments of the arms relative to each other.

9. In combination with a wheelchair, a connecting device for connecting an IV pole to the wheelchair for facilitating the transportation of a patient in the wheelchair, the connecting device comprising:
    an articulated arm comprising first and second segments, pivotally joined together, the proximal end of which is mounted to the wheelchair to pivot about a horizontal axis in a vertical plane extending generally rearwardly from the wheelchair, and to rotate about its axis; and
    a clamp on the distal end of the articulated arm for engaging the IV pole.

10. The combination according to claim 9 wherein the connecting device further comprises a mounting fixture for mounting the proximal end of the arm to the wheelchair, the mounting fixture permitting the arm to pivot about a horizontal axis in vertical plane extending generally rearwardly from the wheelchair, and permitting the arm to rotate about its axis.

11. The combination according to claim 10 wherein the wheel chair is of the type having a hollow tube extending horizontally rearwardly from its lower portion, and wherein the mounting fixture comprises a sleeve for receiving the tube, and a boss inside the sleeve adapted to fit in the hollow tube received in the sleeve.

12. The combination according to claim 11 wherein the mounting fixture further comprises a mounting member pivotally mounted to the sleeve to pivot about a first axis perpendicular to the longitudinal axis of the sleeve, the mounting member pivotally mounting the proximal end of the arm for axial rotation about a second axis generally perpendicular to the first axis.

13. The combination according to claim 12 wherein the first axis is generally horizontal, and extends generally laterally with respect to the wheelchair.

14. The combination according to claim 12 wherein the mounting fixture further comprises a detent mechanism for releasably stopping the pivoting of the mounting member relative to the sleeve.

15. The combination according to claim 12 wherein the mounting fixture further comprises a detent mechanism for releasably stopping the pivoting of the arm relative to the mounting member.

16. The combination according to claim 10 wherein the second segment of the arm has a downward bend therein.

17. The combination according to claim 10 further comprising a fastener for releasably locking the segments of the arms relative to each other.

18. A device for temporarily connecting an IV pole to a wheelchair to facilitate transportation of a patient receiving IV fluids, the device comprising:
    an articulated arm comprising first and second segments pivotally joined together, and a fastener for releasably locking the segments of the arms relative to each other;
    a mounting fixture for mounting the proximal end of the arm to the wheelchair, the mounting fixture being adaptable to permit the arm to pivot about a horizontal axis in a vertical plane extending generally rearwardly from the wheelchair, and permitting the arm to rotate about its axis; and
    a clamp on the distal end of the articulated arm for engaging the IV pole.

19. The device of claim 18 adapted for a wheelchair of the type having a hollow tube extending horizontally rearwardly from the lower portion of the wheelchair, wherein the mounting fixture comprises a sleeve for receiving the tube, and a boss inside the sleeve adapted to fit in the hollow tube received in the sleeve, and wherein the device further comprises a mounting member pivotally mounted to the sleeve to pivot about a first axis perpendicular to the longitudinal axis of the sleeve, the mounting member pivotally mounting the proximal end of the arm for axial rotation about a second axis generally perpendicular to the first axis.

20. The device of claim 19 wherein the mounting fixture further comprises a detent mechanism for releasably stopping the pivoting of the mounting member relative to the sleeve and a detent mechanism for releasably stopping the rotation of the arm relative to the mounting member.

* * * * *